(12) United States Patent
Schaake et al.

(10) Patent No.: US 9,745,868 B2
(45) Date of Patent: Aug. 29, 2017

(54) METHOD FOR OPERATING A SOLAR INSTALLATION

(71) Applicants: Thomas Schaake, Seevetal (DE); Stefan Morgenstern, Reinbek (DE); Heinz-Hugo Bösch, Buchholz (DE)

(72) Inventors: Thomas Schaake, Seevetal (DE); Stefan Morgenstern, Reinbek (DE); Heinz-Hugo Bösch, Buchholz (DE)

(73) Assignee: MAN Diesel & Turbo SE, Augsburg (DE)

( * ) Notice: Subject to any disclaimer, the term of this patent is extended or adjusted under 35 U.S.C. 154(b) by 898 days.

(21) Appl. No.: 13/906,033

(22) Filed: May 30, 2013

(65) Prior Publication Data

US 2014/0013748 A1    Jan. 16, 2014

(30) Foreign Application Priority Data

May 31, 2012   (DE) .................. 10 2012 209 139

(51) Int. Cl.
*F01D 11/04* (2006.01)
*F01D 11/06* (2006.01)
(Continued)

(52) U.S. Cl.
CPC .............. *F01K 17/04* (2013.01); *F01D 11/04* (2013.01); *F01D 11/06* (2013.01); *F01D 19/00* (2013.01);
(Continued)

(58) Field of Classification Search
CPC ........................................................ F24J 2/07
See application file for complete search history.

(56) References Cited

U.S. PATENT DOCUMENTS 4,171,617 A * 10/1979 Sakamoto ................. F01K 3/12
60/641.8
4,484,446 A    11/1984 Goldsberry
(Continued)

FOREIGN PATENT DOCUMENTS

CN    1234848    11/1999
CN    1318737    5/2007
(Continued)

OTHER PUBLICATIONS

Wendelberger K et al: "Betriebsverhalten Eines 600-MW-Kohleblockes in Leistungsregelung", VGB Kraftwerkstechnik, VGB Kraftwerkstechnik GMBH. Essen, DE, Bd. 80, Nr. 3, Jan. 1, 2000 Seiten 36-39.
(Continued)

*Primary Examiner* — Mark Laurenzi
*Assistant Examiner* — Wesley Harris
(74) *Attorney, Agent, or Firm* — Cozen O'Connor

(57) ABSTRACT

Method for operating a solar installation. The solar installation includes a solar field with direct evaporation accompanied by the generation of superheated live steam, a turbine for expanding the live steam, and a generator driven by the turbine for generating electrical energy. At least one valve is associated with the turbine by which the amount of live steam fed to the turbine is adjusted. The valve, or each valve, through which the amount of live steam fed to the turbine is adjusted such that an actual value of a live steam pressure occurring upstream of the turbine follows a reference value determined depending on a live steam temperature of the live steam upstream of the turbine.

6 Claims, 2 Drawing Sheets

(51) Int. Cl.
    *F01D 19/00*     (2006.01)
    *F01D 25/08*     (2006.01)
    *F01D 25/10*     (2006.01)
    *F01D 25/22*     (2006.01)
    *F01K 3/22*     (2006.01)
    *F01K 7/22*     (2006.01)
    *F01K 7/24*     (2006.01)
    *F01K 7/40*     (2006.01)
    *F01K 13/02*     (2006.01)
    *F01K 17/04*     (2006.01)
    *F01K 25/08*     (2006.01)
    *F03G 6/06*     (2006.01)
    *F22B 1/00*     (2006.01)
    *F22B 35/14*     (2006.01)
    *G01F 1/90*     (2006.01)
    *F24J 2/07*     (2006.01)
    *F01D 19/02*     (2006.01)

(52) U.S. Cl.
    CPC ............ *F01D 19/02* (2013.01); *F01D 25/08* (2013.01); *F01D 25/10* (2013.01); *F01D 25/22* (2013.01); *F01K 3/22* (2013.01); *F01K 7/22* (2013.01); *F01K 7/24* (2013.01); *F01K 7/40* (2013.01); *F01K 13/02* (2013.01); *F01K 25/08* (2013.01); *F03G 6/065* (2013.01); *F22B 1/006* (2013.01); *F22B 35/14* (2013.01); *F24J 2/07* (2013.01); *G01F 1/90* (2013.01); *Y02E 10/46* (2013.01); *Y02E 20/16* (2013.01); *Y02E 20/18* (2013.01)

(56) References Cited

U.S. PATENT DOCUMENTS

| | | | |
|---|---|---|---|
| 6,239,504 | B1 | 5/2001 | Gobrecht et al. |
| 7,028,479 | B2 | 4/2006 | Gobrecht et al. |
| 2005/0183421 | A1* | 8/2005 | Vaynberg ............... F01K 25/08 60/641.8 |
| 2012/0255300 | A1* | 10/2012 | Birnbaum ............... F03G 6/065 60/641.8 |

FOREIGN PATENT DOCUMENTS

| | | | | |
|---|---|---|---|---|
| DE | 43 40 340 | | 4/1995 | |
| DE | 102 21 594 | | 11/2003 | |
| DE | 10 2007 01343 | | 9/2008 | |
| DE | 10 2009 060 089 | | 6/2011 | |
| DE | WO 2011080021 | A2 * | 7/2011 | ............ F03G 6/065 |
| EP | 0 316 806 | | 5/1989 | |

OTHER PUBLICATIONS

Sindelar R: "Gewaehrleistung Der Sekundendynamik Eines Dampfkraftwerksblockes", VGB Kraftwerkstechnik, VGB Kraftwerkstechnik GMBH. Essen, DE, Bd. 71, Nr. 1, Jan. 1, 1991 (Jan. 1, 1991), Seiten 4-13.

Office Action dated Mar. 27, 2017 which issued in the corresponding Japanese Patent Application No. 2013-113790.

* cited by examiner

METHOD FOR OPERATING A SOLAR INSTALLATION

BACKGROUND OF THE INVENTION

1. Field of the Invention

The invention is directed to a method for operating a solar installation.

2. Description of the Related Art

In a solar installation, electrical energy is generated from solar energy. For this purpose, a working medium, particularly water, is evaporated in a solar field of the solar installation, and the evaporated working medium is fed to a turbine. The working medium is expanded in the turbine and energy obtained in this way is used to drive a generator of the solar installation. The generator generates electrical energy. The steam of the working medium which is generated in the solar field and fed to the turbine is also known as live steam.

SUMMARY OF THE INVENTION

One embodiment of the present invention is a method for operating a solar installation of the type mentioned above, wherein the solar field operates on the principle of direct evaporation, i.e., wherein the working medium is evaporated in a circuit in the solar field and is expanded in the turbine.

When a solar installation cannot be operated at full load but only at partial load, for example, due to shading of the solar field of the solar installation, it has not been possible to operate the solar installation at optimum efficiency.

There is a need for a solar installation that can be operated at optimum efficiency at both full load and partial load.

On this basis, one embodiment of the present invention provides a novel method for operating a solar installation.

According to one embodiment of the invention, the valve, or each valve, through which the amount of live steam fed to the turbine is adjusted or controlled such that an actual value of a live steam pressure occurring upstream of the turbine follows a reference value determined based at least in part on a live steam temperature of the live steam upstream of the turbine.

It is suggested by one embodiment of the present invention to control the valve, or each valve, through which the amount of live steam fed to the turbine is adjusted so that an actual value of the live steam pressure occurring upstream of the turbine follows the corresponding reference value, wherein this reference value is determined depending on the actual value of the live steam temperature upstream of the turbine. In this way, operation of the solar installation at optimum efficiency is also possible at partial load.

According to an advantageous further development, the live steam temperature is measured by a sensor, and the corresponding actual value is supplied to a controller that generates a reference value for the live steam pressure depending on the actual value of the live steam temperature and, depending on the reference value for the live steam pressure, determines a control variable for the valve, or each valve, such that the actual value of the live steam pressure follows the reference value for the live steam pressure. Operating the solar installation in this way by the controller allows a particularly simple and preferable efficiency-optimized operation of a solar installation.

The invention is further directed to a controller of a solar installation having elements for implementing the method according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are indicated in the subclaims and the following description. Embodiment examples of the invention are described more fully with reference to the drawings without the invention being limited to these embodiment examples. In the drawings:

DETAILED DESCRIPTION OF THE PRESENTLY PREFERRED EMBODIMENTS

Figure 1:
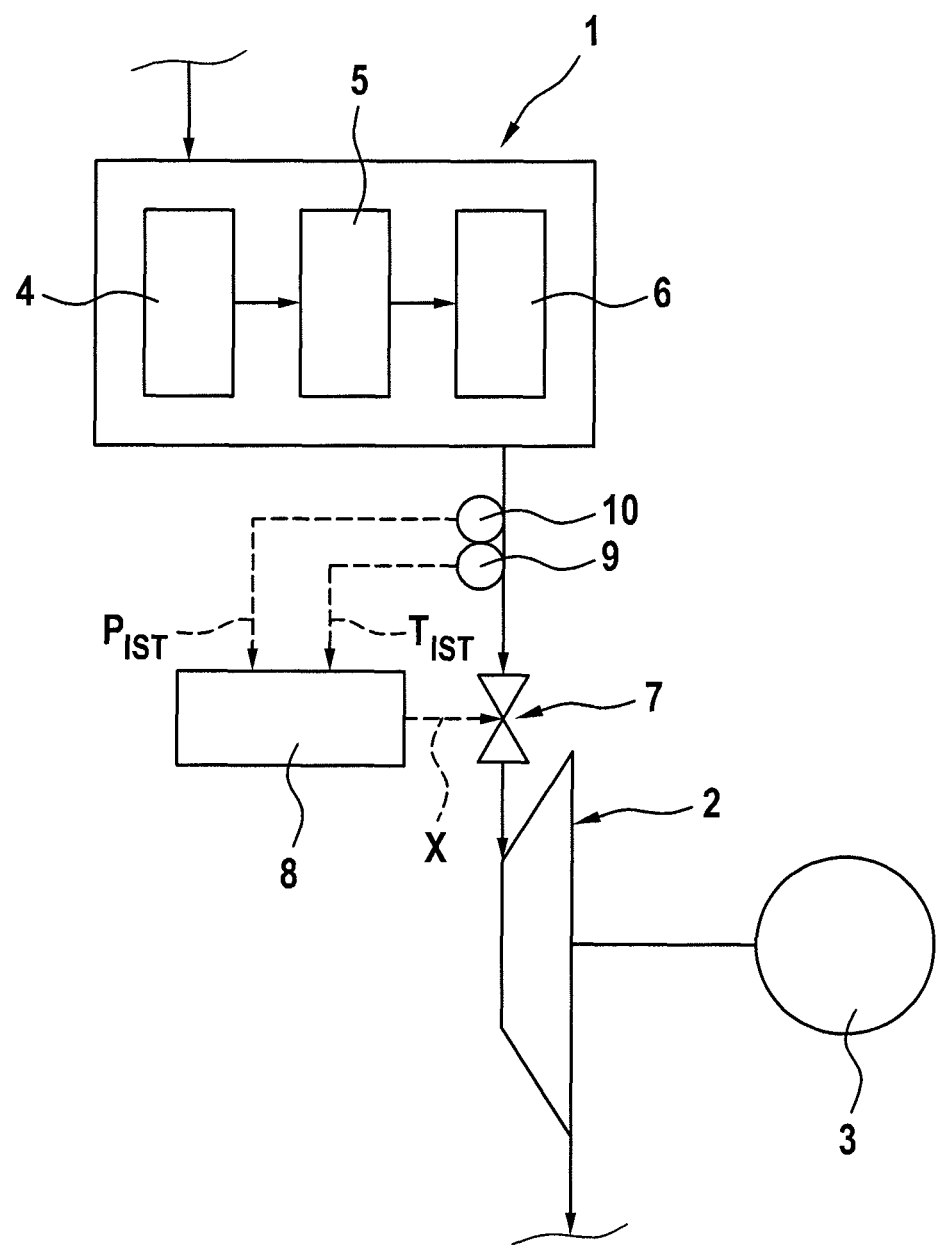
FIG. 1 is a section of a solar installation.

FIG. 1 shows a schematic section of a solar installation that comprises a solar field 1, a turbine 2, and a generator 3. A working medium, particularly water, is evaporated in the solar field 1 of the solar installation. Live steam generated in the solar field 1 is supplied to the turbine 2 for expansion. When the live steam is expanded in the turbine 2, energy is obtained by which the generator 3 can be driven for generating electrical energy.

In the illustrated embodiment, the solar field 1 of the solar installation comprises a preheater 4, an evaporator 5, and a superheater 6. The working medium is preheated to an evaporation temperature in the preheater 4. The actual evaporation of the working medium takes place in the evaporator 5. The steam is superheated in the superheater 6, and the superheater 6 supplies the live steam that is subsequently supplied to the turbine 2 for expansion.

The amount of live steam to be fed to the turbine 2 for expansion can be adjusted by at least one valve 7. The valve 7, or each valve 7, can be an integral component part of the turbine 2.

Within the meaning of the present invention, the valve 7, or each valve 7, by which the amount of live steam fed to the turbine 2 is adjusted for operating the solar installation is controlled such that an actual value $p_{IST}$ of a live steam pressure p occurring upstream of the turbine 2 follows a corresponding reference value $p_{SOLL}$, which is determined depending on an actual value $T_{IST}$ of a live steam temperature T of the live steam upstream of the turbine 2.

The valve 7, or each valve 7, is preferably controlled such that the actual value $p_{IST}$ of the live steam pressure p occurring directly upstream of the valve 7 or of each valve 7 follows the corresponding reference value $p_{SOLL}$ which, as was already mentioned, is determined depending on the actual value $T_{IST}$ of the live steam temperature of the live steam directly upstream of the valve 7 or each valve 7.

A controller 8 is used to carry out the method according to one embodiment of the invention. The actual value $T_{IST}$ of the live steam temperature upstream of the turbine 2 or upstream of the valve 7, or each valve 7, is supplied to the controller 8. This actual value $T_{IST}$ of the live steam temperature is determined by a sensor 9. Depending on this actual value of the live steam temperature, the controller 8 determines a reference value $p_{SOLL}$ for the live steam pressure of the live steam upstream of the turbine 2 or upstream of the valve 7 or each valve 7, and depending on this reference value $p_{SOLL}$ for the live steam pressure the controller 8 determines a control variable X for the valve 7 or each valve 7 such that the actual value $p_{IST}$ of the live steam pressure follows the reference value $p_{SOLL}$ for the live steam pressure.

Figure 2:
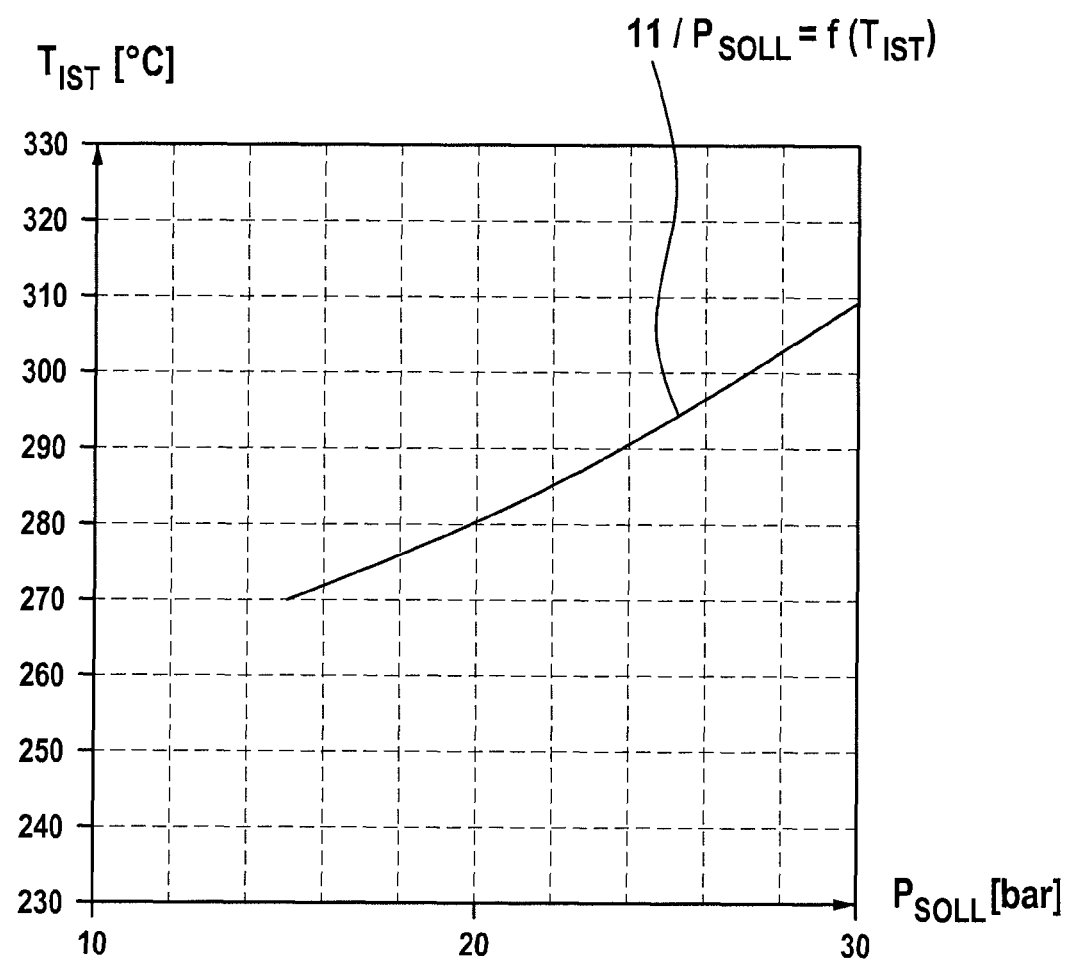
FIG. 2 is a diagram illustrating the method according to one embodiment of the invention for operating a solar installation.

The determination of the reference value $p_{SOLL}$ for the live steam pressure depending on the actual temperature $T_{IST}$ of the live steam temperature in the controller 8 is preferably carried out by a characteristic line 11. FIG. 2 shows an exemplary characteristic line 11 which is used for determining the reference value $p_{SOLL}$ for the live steam pressure depending on the actual value $T_{IST}$ of the live steam temperature.

In the characteristic line 11 of FIG. 2, a reference value for the live steam pressure $p_{SOLL}$ of approximately 30 bar is determined at an actual live steam temperature $T_{IST}$ of about 310° C. At a temperature $T_{IST}$ of the live steam of about 280° C., a reference value $p_{SOLL}$ for the live steam pressure of about 19.5 bar is generated.

As was already mentioned, the controller 8 determines the control variable X for the valve 7, or each valve 7, depending on the reference value $p_{SOLL}$ for the live steam pressure so that the actual value $p_{IST}$ of the live steam pressure follows the reference value $p_{SOLL}$ of the live steam pressure. For this purpose, the control variable X is preferably generated depending on a control deviation between the reference value $p_{SOLL}$ of the live steam pressure and the actual value $p_{IST}$ of the live steam pressure. According to FIG. 1, the actual value $p_{IST}$ of the live steam pressure is determined by a sensor 10 and is supplied to the controller 8.

In accordance with one embodiment of the invention, it is possible to operate a solar installation with optimum efficiency at full load as well as at partial load. Accordingly, when less live steam is generated in the solar field 1 because of shading therein, the turbine 2 can be operated at optimal efficiency to generate a maximum of electrical energy by the generator 3. The invention allows operation of the solar installation with an optimal combination of the available amount of live steam, the available enthalpy drop, and loading of the individual component groups of the solar installation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a solar installation, comprising:
   generating superheated live steam in a solar field by direct evaporation;
   expanding the superheated live steam within a turbine;
   driving a generator with the turbine to generate electrical energy;
   adjusting an amount of superheated live steam fed to the turbine by at least one valve associated with the turbine; and
   controlling the at least one valve such that an actual value of a live steam pressure occurring upstream of the turbine matches a reference value determined based at least in part on a live steam temperature of the superheated live steam upstream of the turbine.

2. The method according to claim 1, wherein the at least one valve is controlled such that the actual value of a live steam pressure occurring upstream of the at least one valve matches a reference value determined based at least in part on a live steam temperature of the superheated live steam upstream of the at least one valve.

3. The method according to claim 2, wherein the controlling the at least one valve further comprising:
   measuring an actual value of the live steam temperature by a sensor;
   supplying the actual value to a controller;
   generating a reference value for the live steam pressure based at least in part on the actual value of the live steam temperature; and
   determining based at least in part on the reference value for the live steam pressure a control variable for the at least one valve such that the actual value of the live steam pressure follows the reference value for the live steam pressure.

4. The method according to claim 3, wherein the controller generates the control variable for the at least one valve based at least in part on a control deviation between the actual value of the live steam pressure detected by the sensor and the reference value for the live steam pressure.

5. The method according to claim 4, wherein the reference value for the live steam pressure is determined base at least in part on the actual value of the live steam temperature by a characteristic line.

6. A controller of a solar installation having a solar field, a turbine, a generator, and at least one valve, the controller configured to control:
   generation of superheated live steam in the solar field by direct evaporation;
   expansion of the superheated live steam within the turbine;
   driving of the generator with the turbine to generate electrical energy,
   adjusting an amount of superheated live steam fed to the turbine by the at least one valve associated with the turbine; and
   controlling the at least one valve such that an actual value of a live steam pressure occurring upstream of the turbine matches a reference value determined based at least in part on a live steam temperature of the live steam upstream of the turbine.

* * * * *